United States Patent [19]
Smith

[11] Patent Number: 5,982,991
[45] Date of Patent: Nov. 9, 1999

[54] METHOD AND APPARATUS FOR SWITCHING BETWEEN BINARY AND ARITHMETIC OPERATORS DURING RASTER OPERATIONS

[75] Inventor: Marcus A. Smith, Boise, Id.

[73] Assignee: Hewlett-Packard Company, Palo Alto, Calif.

[21] Appl. No.: 08/890,250

[22] Filed: Jul. 8, 1997

[51] Int. Cl.[6] .......................... G06T 15/00; G05B 11/00
[52] U.S. Cl. ................. 395/109; 395/109; 395/101; 395/106; 395/110; 395/115
[58] Field of Search ...................... 395/101–107, 395/135, 141, 707, 708, 709, 200, 800, 109, 112, 114, 115, 110; 345/433, 434, 435

[56] References Cited

U.S. PATENT DOCUMENTS

| | | | |
|---|---|---|---|
| 5,254,979 | 10/1993 | Trevett et al. ........................... | 345/113 |
| 5,603,013 | 2/1997 | Ohara ................................... | 395/500.44 |
| 5,742,538 | 4/1998 | Guttag et al. ............................ | 708/620 |
| 5,742,703 | 4/1998 | Lin et al. ................................. | 382/176 |
| 5,745,121 | 4/1998 | Politis .................................... | 345/433 |
| 5,768,489 | 6/1998 | Adachi et al. ........................... | 395/117 |
| 5,771,048 | 6/1998 | Nankou et al. .......................... | 345/471 |

*Primary Examiner*—David K. Moore
*Assistant Examiner*—Douglas Tran

[57] ABSTRACT

The method of the invention performs logical operation on a pixel image, wherein pixels of the image comprise multi-bit color pixel values. The method performs the steps of: identifying a received image as an image type other than a raster image; and if such identified image type consists of fully saturated multi-bit color pixel values, performing logical combination operations on the multi-bit color pixel values through use of binary logical operators. If the received image is identified as including other than fully saturated multi-bit color pixel values, performing logical combination operations on the multi-bit color pixel values using arithmetic logical operators.

6 Claims, 2 Drawing Sheets

METHOD AND APPARATUS FOR SWITCHING BETWEEN BINARY AND ARITHMETIC OPERATORS DURING RASTER OPERATIONS

FIELD OF THE INVENTION

This invention relates to the processing of raster arranged image data using raster operation logical operators and, more particularly, to a method and apparatus for implementing raster operations when employing multi-bit pixel representations.

BACKGROUND OF THE INVENTION

Modern printers (e.g., laser and inkjet) receive image data from a host processor and convert that data, via a number of steps, into a multi-pixel raster representation. The raster representation is then fed to a print engine, such as a laser printer or an inkjet printhead, for rendering onto a media sheet. The most widely used printers today require only one bit per pixel. Conversion of image data from a host processor into a binary pixel image requires the implementation of certain raster operations to achieve a combination of patterns, text, and raster graphics. Certain raster operations employ logical operators which logically combine two or more input values to achieve a pixel result. So long as raster operations are performed on binary pixel representations, logical binary operators are perfectly satisfactory and enable the print image preparation procedure to operate at high speed.

Recently, color printers, both laser and ink jet, have entered the marketplace and represent each pixel, not by a binary value, but rather by a combination of multi-bit values which represent colors that can be combined to render a multiplicity of different color combinations. To conserve memory space and improve the speed of logical operations, individual color values are generally constrained to eight or less (e.g., four) bits each. Each color pixel is then represented by three multi-bit values designating the intensity of three primary colors.

To perform raster operations on multi-bit per pixel color images, the prior art has employed both binary operators and arithmetic operators. The binary operators comprise the known AND, OR, NOT and XOR functions. The corresponding arithmetic operators are shown in Table I below.

TABLE 1

Binary and Arithmetic Operations

| Pixel Operation | Binary Operator | Arithmetic Operator |
|---|---|---|
| $P_0$ AND $P_1$ | $P_0 \wedge P_1$ | MIN($P_0$, $P_1$) |
| $P_0$ OR $P_1$ | $P_0 \vee P_1$ | MAX($P_0$, $P_1$) |
| NOT $P_0$ | $-P_0$ | MAX_PIXEL_VAL $- P_0$ |
| $P_0$ XOR $P_1$ | $P_0 \otimes P_1$ | ABS($P_0 - P_1$) |

Upon first examination, while it would appear that binary and arithmetic operators render the same output, such is not always the case. To understand this, assume the presence of two 4-bit pixel values, one having the value of 1000 (binary) and the other having the value 0111 (binary). Further, assume that a color being represented by these two pixels is black and that the maximum value for a black pixel is 16 (or $2^4$). Using the AND binary operator between these two medium black pixels yields a result of 0. Using an AND arithmetic operator between the same two pixels yields a result of 0111, which is the expected result.

Table 2 below further contrasts the difference between binary and arithmetic operators for multi-bit pixels.

TABLE 2

Binary vs. Arithmetic Usage

| Pixel Operation | Binary Operator Results | Arithmetic Operator Results | Which Correct? |
|---|---|---|---|
| 1000 AND 0111 | 0000 | 0111 | 0111 |
| 0101 OR 1010 | 1111 | 1010 | 1111 |
| NOT $b_1b_2b_3b_4$ | | Result the same | |
| 1001 XOR 0111 | 1110 | 0010 | 0010 |

Table 2 shows that there is a definite difference between operators in the multi-bit case. The problem with many printers that employ both binary and color imaging is that such printers often solely utilize binary operators which inherently operate on one bit at a time. Multi-bit data collects bits into pixel values, which binary operators are unable to preserve in all but extreme cases.

It is clear that to achieve a best image representation, that multi-bit pixels require arithmetic operators when raster operations are performed. The problem with support by a printer of arithmetic operators is their impact on performance of the printer. Arithmetic operators consume much more processor time than their binary counterparts. Table 3 below shows this difference for an exemplary instruction speed.

TABLE 3

Binary vs. Arithmetic Speed Differences

| Operation | Binary Speed | Arithmetic Speed | Speed Difference/Page |
|---|---|---|---|
| AND | 1 | 1.5 | 50% |
| OR | 1 | 1.5 | 50% |
| NOT | 1 | 1 | 0% |
| XOR | 1 | 2.5 | 150% |

Table 3 shows the increase in processor work for each raster operation on one pixel. When it is realized that there are 33,660,000 pixels in one full-page letter print job, a 50% increase in workload per pixel results in a substantial increase in processor time. Further, most common raster operations utilize 3 to 4 operations to obtain a result. Accordingly, a significant processing penalty results when using arithmetic raster operations.

As a result of the aforesaid processing penalties, the prior art has continued to use binary operators when performing raster operations, even upon multi-bit pixel representations. This results in some alteration in the color or saturation of the resultant image due to the erroneous values that result when using a binary operator on a multi-bit pixel image.

Accordingly, it is an object of this invention to provide a method and apparatus for enabling generation of a high-quality color image representation when performing raster operations on multi-bit pixel values.

It is another object of this invention to provide an improved method and apparatus for performing raster operations on multi-bit pixel images, while minimizing processing penalties and achieving high quality image outputs.

SUMMARY OF THE INVENTION

The method of the invention performs logical operation on a pixel image, wherein pixels of the image comprise multi-bit color pixel values. The method performs the steps of: identifying a received image as an image type other than a raster image; and if such identified image type further consists of fully saturated multi-bit color pixel values, performing logical combination operations on the multi-bit color pixel values through use of binary logical operators. If the received image is identified as including other than fully saturated multi-bit color pixel values, performing logical combination operations on the multi-bit color pixel values using arithmetic logical operators.

DETAILED DESCRIPTION OF THE INVENTION

It has been realized that when multi-bit pixel values are subjected to raster operations using binary operators, that invariably correct outputs occur only when all bits of each respective pixel have the same value (i.e., all 0's or all 1's). Consider the logical AND of two 4 bit-per-pixel, pixel values of 0000 and 1111. Their binary logical AND combination produces the result of 0000. Their arithmetic AND combination, using an arithmetic operator, also produces the same result. Thus, when multi-bit pixels are either fully on or fully off, so as to correspond to fully saturated primary or secondary colors (or white), a binary operator can be used to perform a raster operation upon the respective pixel values.

Figure 1:
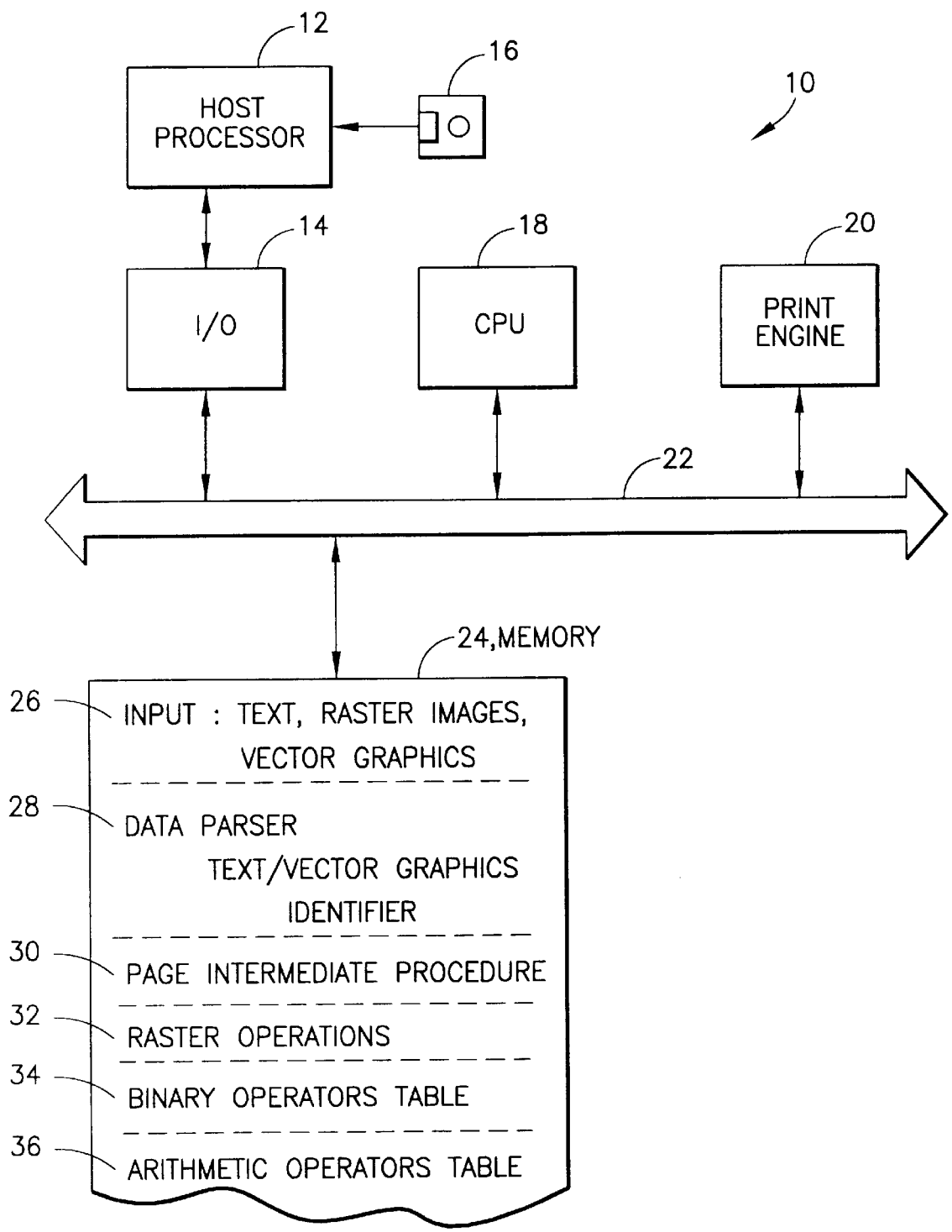
FIG. 1 is a block diagram of a system incorporating the invention.

Turning to FIG. 1, a printer 10 is coupled to a host processor 12 and receives print jobs therefrom via input/output interface 14. The procedure which embodies the invention can be loaded into printer 10 via a disk 16 that is inserted into a floppy drive mechanism (not shown) in host processor 12. Further, the process of the invention can be incorporated into a read-only memory (not shown) already present in printer 10. Hereafter, it will be assumed that the procedures which control the operation of the invention have been loaded via a disk 16.

Printer 10 is controlled by a central processing unit (CPU) 18 which is coupled to a print engine 20 via a bus system 22. Also coupled to CPU 18 is a memory 24 which, for the purposes of describing the invention, will be assumed to have been loaded with all of the necessary procedures required to operate printer 10.

Memory 24 includes a plurality of allocated regions for storage of various data types employed during the printer operation. Region 26 stores data comprising a print job received from host processor 12 that includes text, raster images and vector graphics. That data is generally in the form of a control language such as PCL (Printer Control Language) or PostScript. A data parser 28 is present in memory 24 and, in conjunction with CPU 18, analyzes the input control language data maintained in region 26 and, among other actions, identifies portions thereof as being either text, vector graphics or a raster image.

A page intermediate process 30 accepts data from parser 28 and segregates the data into page strips and into a page intermediate format, in the known manner. A rasterizer procedure then receives the page intermediate format data and converts it into a raster image, suitable for printing by print engine 20. During the rasterizing process, color plane image data is combined using various raster operations. During this action, either a binary operators table 34 or an arithmetic operators table 36 is used to perform the logical raster operation.

As will be hereafter understood, if data parser procedure 28 identifies a received image portion as other than a raster image, and the image portion further consists of fully saturated multi-bit color pixel values, binary operators table 34 is chosen to handle raster operations for the thus classified image portion. Otherwise, arithmetic operators table 36 is chosen to perform the logical raster operation.

Data parser 28 analyzes the input data from host processor 12 as it is received (or in batch fashion). To classify image portions as to whether they are text, raster or vector graphics, data parser 28 examines the control code stored in region 26. Control code languages generally precede both text and vector graphics data segments with specific escape code sequences that identify the following data as either a text or a vector graphics image. By thus examining the input control language data, portions of the input image data can be identified as to type, and an identifier appended thereto which follows the text/vector graphics/raster image data (as a classification indicator), through subsequent image processing.

Text and vector graphics images, if represented by a primary or a secondary color, are generally represented by fully saturated color values. A primary color is one of: red, green or blue; and a secondary color is one of: cyan, magenta, yellow or black. Thus, each pixel of a vector graphics or text image, if represented by a primary or secondary color (e.g., by three 8-bit bytes), will generally have one byte which will evidence a value of either 0 or 255. The remaining two bytes will have 0 values. Accordingly, text and vector graphics images can utilize binary operators from binary operators table 34 during subsequent rasterizing actions carried out by raster operations procedure 32.

Raster images, by contrast, may have any combination of color values in the 3 bytes which comprise each pixel value. Therefore, during raster operations, such image data is processed using logical operators from arithmetic operators table 36 to assure accurate color representation. It is to be understood that once an image portion is identified as either text, raster image or vector graphics, the entire image portion so identified is handled in a common fashion. Thus, even though a raster image may include fully saturated color values, raster operations procedure 32 still utilizes arithmetic operators table 32 for the reason that to make a pixel-by-pixel decision would create too great a processing load and, in effect, would exceed the time required to perform the raster operation using arithmetic operators.

Figure 2:
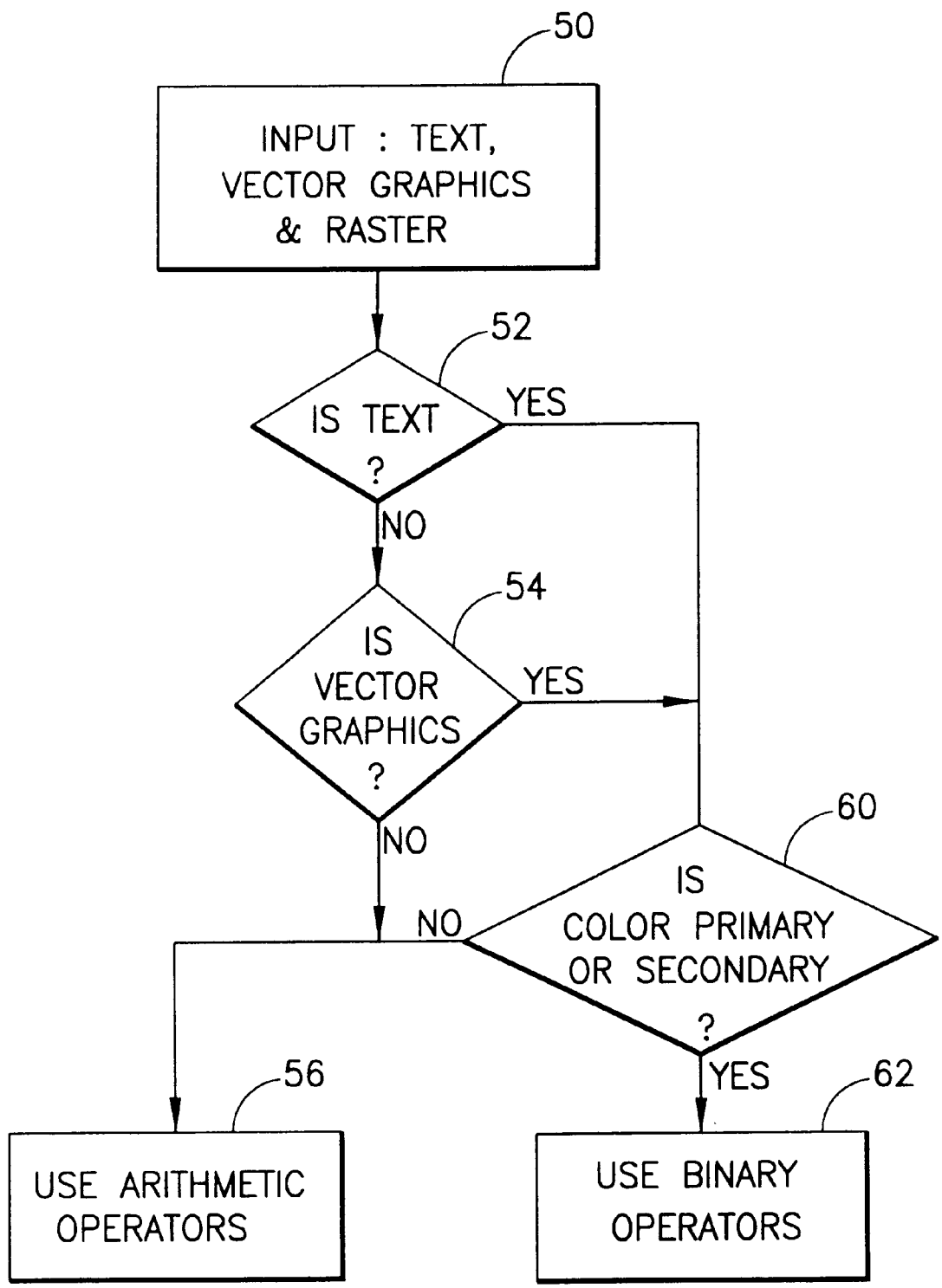
FIG. 2 is a logical flow diagram illustrating the operation of the invention.

Turning to FIG. 2, the procedure of the invention will be described. Initially (box 50) input data is received as text, vector graphics or raster data. Thereafter, it is decided by data parser 28 whether the data is text (decision box 52); or whether the data is vector graphics (decision box 54). If the answer is no in both instances, (i.e., it is raster image data), a code is appended to the raster image data which, upon being examined by raster operations procedure 32 causes all logical raster operations therein to utilize arithmetic operators from arithmetic operators table 36 (box 56).

If the data is determined to be either text or vector graphics, and the color data thereof is determined to be a primary or secondary color (decision box 60), then it is known that the color data is fully saturated and binary operators are used from binary operators table 34 (box 62). If, however, the text or vector graphics do not use a primary or secondary color (decision box 60), the procedure appends a code thereto which causes raster operations procedure 32 to employ arithmetic operators from arithmetic operator table 36.

Accordingly, by initially classifying the input data as either text, vector graphics or raster image, raster operations procedure 32 is enabled to utilize either binary operators or arithmetic operators, as the case may be, to achieve a highly efficient processing operation. In all instances, if the data is identified as a raster image, arithmetic operators are employed. Otherwise, the data is identified as either text or vector graphics. If such classified images employ primary or secondary colors, then binary operators are utilized from binary operator table 30. Otherwise, further raster operations are performed using arithmetic operators.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for performing a logical operation on a pixel image wherein pixels of said image comprise multi-bit color pixel values, said method comprising the steps of:
   a) identifying a received image as an image type other than a raster image;
   b) if said image type other than a raster image consists of fully saturated multi-bit color pixel values, performing logical combination operations on said multi-bit color pixel values using binary logical operators;
   c) if said received image is identified as a raster image, performing logical combination operations on said multi-bit color pixel values using arithmetic logical operators; and
   d) if said image type other than a raster image includes other than fully saturated multi-bit color pixel values, performing logical combination operations on said multi-bit color pixel values using arithmetic logical operators.

2. The method as recited in claim 1, wherein step a) identifies said image type other than a raster image as either a text image or a vector graphics image.

3. The method as recited in claim 1, wherein step b) determines if said image type other than a raster image consists of fully saturated multi-bit color pixel values, by determining if said image type other than a raster image consists of a primary or secondary color, a primary color being one of cyan, magenta, yellow or black and a secondary color being one of red, green or blue.

4. A memory containing instructions for controlling a printer to perform a logical operation on a pixel image wherein pixels of said image comprise multi-bit color pixel values, said memory containing:
   a) means for controlling said printer to identify a received image as an image type other than a raster image;
   b) means for controlling said printer, upon said image type being identified to be other than a raster image consisting of fully saturated multi-bit color pixel values, to perform logical combination operations on said multi-bit color pixel values using binary logical operators;
   c) means for controlling said printer, upon said received image being identified as a raster image, to perform logical combination operations on said multi-bit color pixel values using arithmetic logical operators; and
   d) means for controlling said printer, upon said image type being identified to be other than a raster image consisting of other than fully saturated multi-bit color pixel values, to perform logical combination operations on said multi-bit color pixel values using arithmetic logical operators.

5. The memory as recited in claim 4, wherein means a) identifies said image type other than a raster image as either a text image or a vector graphics image.

6. The memory as recited in claim 4, wherein means b) determines if said image type other than a raster image consists of fully saturated multi-bit color pixel values, by determining if said image type other than a raster image consists of a primary or secondary color, a primary color being one of cyan, magenta, yellow or black and a secondary color being one of red, green or blue.

* * * * *